United States Patent
Ryu et al.

(10) Patent No.: US 9,839,564 B2
(45) Date of Patent: Dec. 12, 2017

(54) AUTOMATIC SLOPE ADJUSTING DEVICE

(71) Applicant: KOREA AIRPORTS CORPORATION, Seoul (KR)

(72) Inventors: Jae Bok Ryu, Jeju-do (KR); Sung Il Kim, Jeju-do (KR); Sang Ju Roh, Jeju-do (KR)

(73) Assignee: KOREA AIRPORTS CORPORATION (KR)

( * ) Notice: Subject to any disclaimer, the term of this patent is extended or adjusted under 35 U.S.C. 154(b) by 0 days.

(21) Appl. No.: 14/983,707

(22) Filed: Dec. 30, 2015

(65) Prior Publication Data

US 2016/0193093 A1  Jul. 7, 2016

Related U.S. Application Data

(63) Continuation of application No. PCT/KR2014/005892, filed on Jul. 2, 2014.

(30) Foreign Application Priority Data

Jul. 3, 2013 (KR) .................. 10-2013-0077708

(51) Int. Cl.
| | |
|---|---|
| *A61G 3/06* | (2006.01) |
| *B64F 1/305* | (2006.01) |
| *G06Q 50/00* | (2012.01) |
| *B60P 1/43* | (2006.01) |
| *E04F 11/00* | (2006.01) |

(52) U.S. Cl.
CPC ............... *A61G 3/061* (2013.01); *B60P 1/43* (2013.01); *B64F 1/305* (2013.01); *E04F 11/002* (2013.01); *G06Q 50/00* (2013.01)

(58) Field of Classification Search
CPC .......... A61G 3/061; B64F 1/305; B60P 1/43; G06Q 50/00; E04F 11/002
USPC .................................... 14/69.5, 71.5
See application file for complete search history.

(56) References Cited

U.S. PATENT DOCUMENTS

| | | | | |
|---|---|---|---|---|
| 2,993,219 | A * | 7/1961 | Pennington | ........ B65G 69/2829 14/71.7 |
| 3,184,773 | A * | 5/1965 | Breneman | .............. B65G 69/30 14/69.5 |
| 5,257,431 | A * | 11/1993 | Larson | .................... B64F 1/305 14/71.5 |
| 7,069,611 | B2 * | 7/2006 | Larson | ...................... B64F 1/30 14/71.1 |

(Continued)

FOREIGN PATENT DOCUMENTS

| | | |
|---|---|---|
| CN | 2727049 Y | 9/2005 |
| CN | 1712310 A | 12/2005 |

(Continued)

OTHER PUBLICATIONS

International Search Report of PCT/KR2014/005892 dated Oct. 2, 2014.

*Primary Examiner* — Raymond W Addie
(74) *Attorney, Agent, or Firm* — Riverside Law LLP

(57) ABSTRACT

An automatic slope adjusting device is provided herein. The automatic slope adjusting device may include a slope type footrest unit configured to form a sloped passage; and a driving unit configured to adjust an inclination angle of the slope type footrest unit, and a length of the slot type footrest unit in a forward-backward direction thereof.

6 Claims, 6 Drawing Sheets

(56) References Cited

U.S. PATENT DOCUMENTS

| | | | |
|---|---|---|---|
| 7,188,383 B2 * | 3/2007 | Tholen | B64F 1/3055 14/71.5 |
| 7,596,826 B2 * | 10/2009 | Anderberg | B64F 1/305 14/69.5 |
| 7,669,270 B2 * | 3/2010 | Hutton | B64F 1/3055 14/71.5 |
| 2003/0179127 A1 * | 9/2003 | Wienand | G07C 9/00 342/28 |
| 2011/0258787 A1 | 10/2011 | Shi et al. | |
| 2015/0013083 A1 * | 1/2015 | Palmersheim | B65G 69/003 14/71.3 |
| 2015/0040329 A1 * | 2/2015 | Palmersheim | B65G 69/2817 14/71.3 |

FOREIGN PATENT DOCUMENTS

| | | |
|---|---|---|
| CN | 102233954 | 11/2011 |
| CN | 202147845 U | 2/2012 |
| JP | 2004-090771 | 3/2004 |
| JP | 2012-079140 | 4/2012 |
| KR | 10-2011-0015281 | 2/2011 |
| KR | 10-1105596 | 1/2012 |
| KR | 10-2013-0051575 | 5/2013 |

* cited by examiner

AUTOMATIC SLOPE ADJUSTING DEVICE

CROSS-REFERENCE TO RELATED APPLICATION

This Application is a continuation application of PCT Application No. PCT/KR2014/005892 filed on Jul. 2, 2014, which claims the benefit of Korean Patent Application No. 10-2013-0077708 filed on Jul. 3, 2013, the entire disclosures of which are incorporated herein by reference.

TECHNICAL FIELD

The embodiments described herein pertain generally to an automatic slope adjusting device.

BACKGROUND

In modern society, not only the congenital handicapped but also the acquired handicapped tend to keep increasing due to a variety of reasons such as traffic accident or industrial accident. Mobility right of the transportation vulnerable such as the handicapped is a right complying with the fundamental human right. In this regard, it is required to provide high-class service for the transportation vulnerable in the field of aviation which is a high-quality means of transportation.

Further, with the advent of an aging society, the demand for guaranteeing the mobility right of the transportation vulnerable is steadily increasing. In view of the lack of publicity and social consensus upon barrier-free environment, however, it is still required to actively participate in building up the barrier-free environment.

Moreover, in spite of increase of domestic or foreign tourists, facilities for the transportation vulnerable in Korean airports including Jeju Airport are much inferior to those in the advanced countries. In this regard, starting from the year of 2008, the Ministry of Construction and Transportation has run "barrier-free Certification system" for evaluating and authenticating whether a means of transportation, a passenger facility, a road, a district, a building, a park, or the like is designed and constructed so that the transportation vulnerable such as the handicapped, the elderly, and the pregnant do not experience inconvenience in transportation. That is, there have been made various government-wide efforts to protect the mobility right of the transportation vulnerable.

In general, there is a height difference (step) between a floor-level of a boarding gate of an airplane and a floor-level of a front end passage of a boarding bridge, which may cause a problem in a wheel-driven transportation such as a wheelchair for the handicapped. For this reason, there has been a strong demand for the development of an automatic slope adjusting device capable of connecting the airplane and the boarding bridge to thereby allow the transportation vulnerable not to suffer discomfort in transportation throughout the whole process from the arrival at the airport to the boarding onto the airplane. A related technology is described in Japanese Patent Publication No. 2004-090771 (2004 Mar. 25).

DISCLOSURE OF THE INVENTION

Problems to be Solved by the Invention

Example embodiments are conceived to solve the aforementioned problems and provide an automatic slope adjusting device capable of resolving a height difference between a boarding bridge and an airplane when they are connected.

Means for Solving the Problems

An automatic slope adjusting device is provided herein. The automatic slope adjusting device may include a slope type footrest unit configured to form a sloped passage; and a driving unit configured to adjust an inclination angle of the slope type footrest unit, and a length of the slot type footrest unit in a forward-backward direction thereof.

Effect of the Invention

According to the example embodiment, the slope type footrest unit is buried in a floor, and a sloped passage is formed as the inclination angle and the length of the slope type footrest unit is adjusted by the driving unit. Thus, it is possible to immediately cope with a characteristic of an individual user using the airplane by removing a height difference between the airplane and the boarding bridge, thus allowing the user, especially, the transportation vulnerable, to use the airplane more conveniently, while securing the safety of the user as well.

MODE FOR CARRYING OUT THE INVENTION

Figure 1:
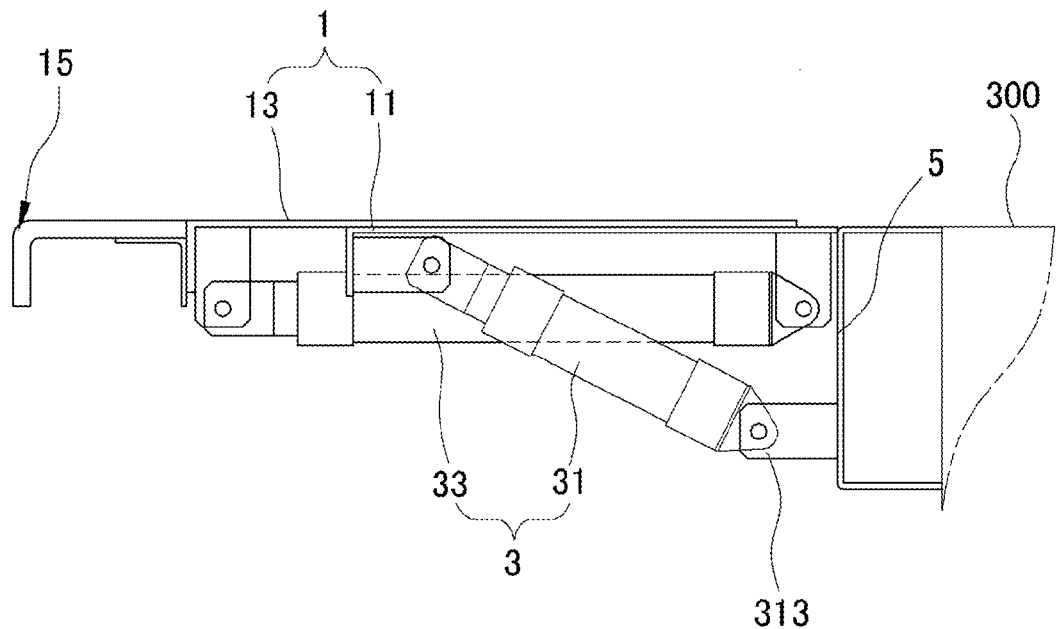
FIG. 1 is a schematic side view of an automatic slope adjusting device according to an example embodiment, in which a guide member and an engagement member are not illustrated.

Hereinafter, example embodiments will be described in detail so that inventive concept may be readily implemented by those skilled in the art. However, it is to be noted that the present disclosure is not limited to the example embodiments and examples but can be realized in various other ways. In drawings, parts not directly relevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled to" another element and a case where an element is "electronically connected or coupled to" another element via still another element.

Through the whole document, the term "on" that is used to designate a position of one element with respect to another element includes both a case that the one element is adjacent to the another element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" are intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

For reference, in the following description of the example embodiments, terms (front, front end, rear, rear end, lower side, etc.) related to directions or positions are defined by setting the side where a base member 5 is coupled with respect to a slope type footrest unit 1 as a rear side and, also, by setting the side where a second plate 131 is disposed with respect to a first plate 111 as an upper side. For example, referring to FIG. 1, a direction oriented toward 9 o'clock is defined as a front side; an end portion or a surface oriented toward 9 o'clock, a front end; a direction oriented toward 3 o'clock, a rear side; and an end portion or a surface oriented toward 3 o'clock, a rear end. As another example, referring to FIG. 3C, a direction oriented toward 10 o'clock is defined as a front side; an end portion or a surface oriented toward 10 o'clock, a front end; a direction oriented toward 4 o'clock, a rear side; an end portion or a surface oriented toward 4 o'clock, a rear end; and a direction oriented toward 7 o'clock, a lower side.

Example embodiments are directed to an automatic slope adjusting device.

Below, an automatic slope adjusting device according to an example embodiment (hereinafter, referred to as "subject automatic slope adjusting device") will be explained.

Figure 2:
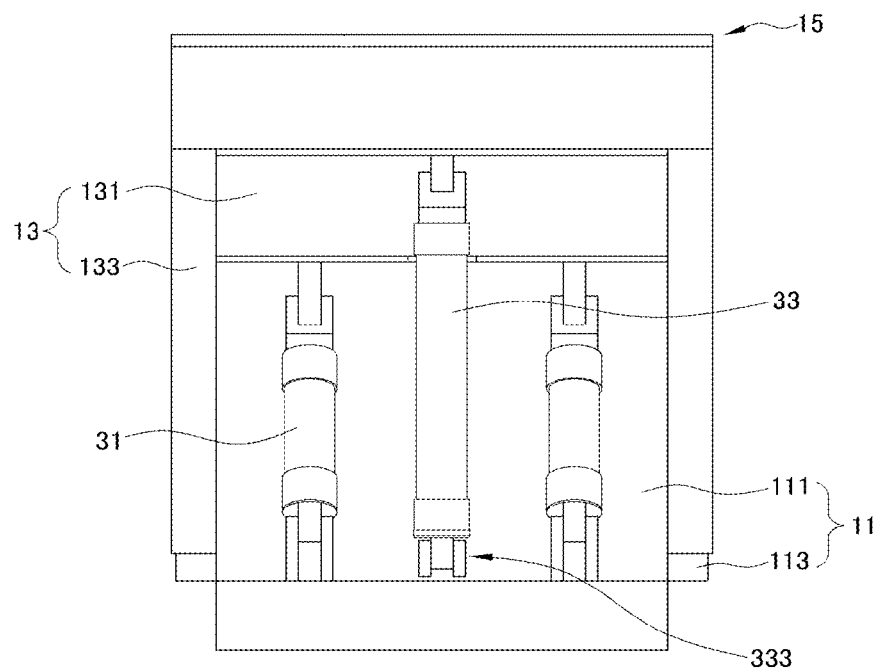
FIG. 2 is a schematic bottom view of the automatic slope adjusting device according to the example embodiment.
Figure 3A:
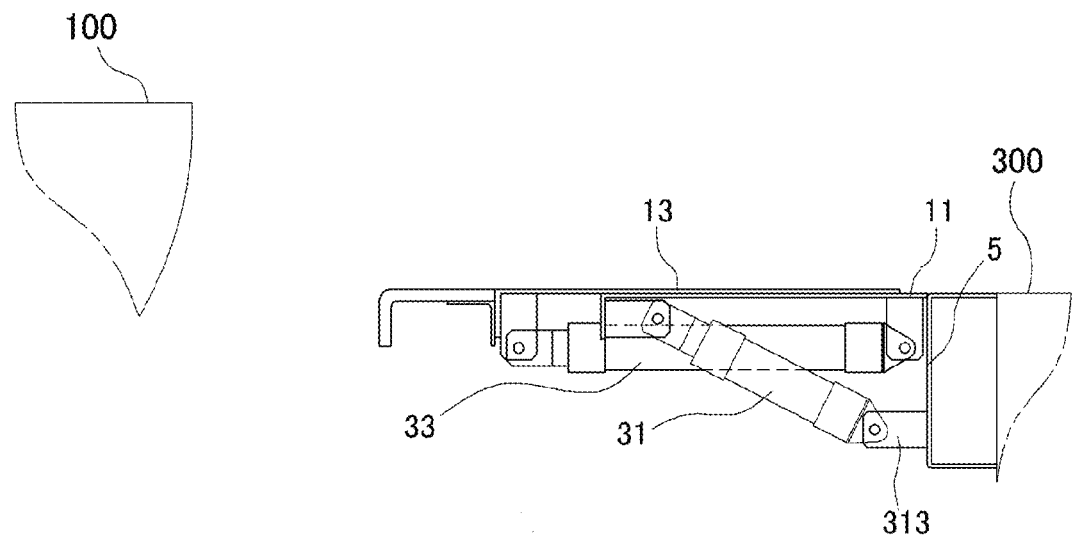
FIG. 3A to FIG. 3C are schematic conceptual side views illustrating an operation of the automatic slope adjusting device according to the example embodiment.
Figure 3B:
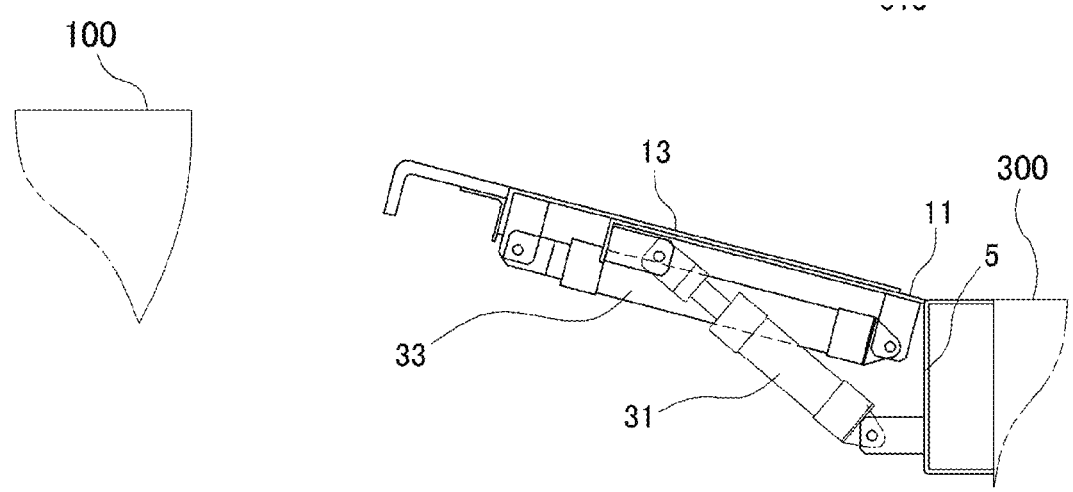
Figure 3C:
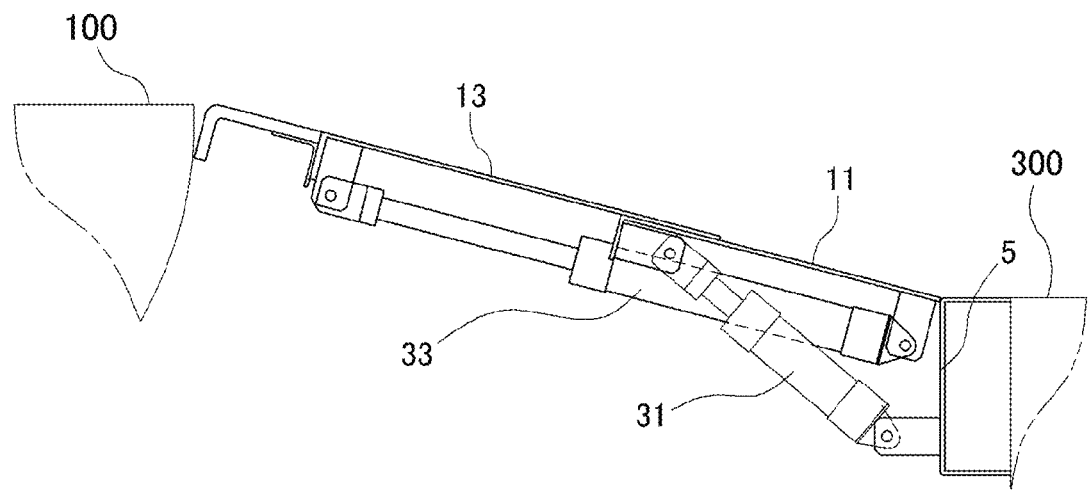
Figure 4A:
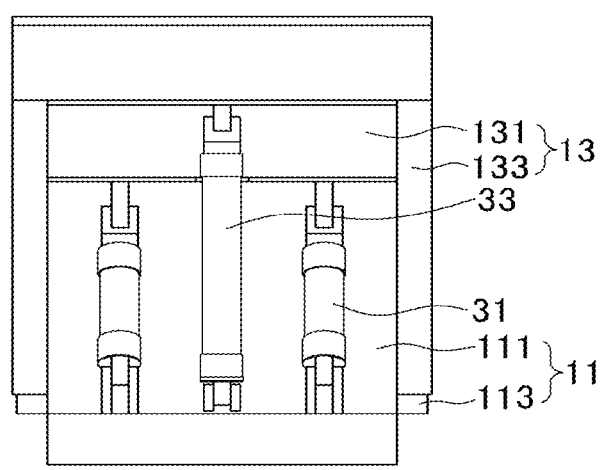
FIG. 4A and FIG. 4B are schematic conceptual diagrams for describing a relative sliding movement of a second footrest with respect to a first footrest through engagement between a guide member of the first footrest and an engagement member of the second footrest.
Figure 4B:
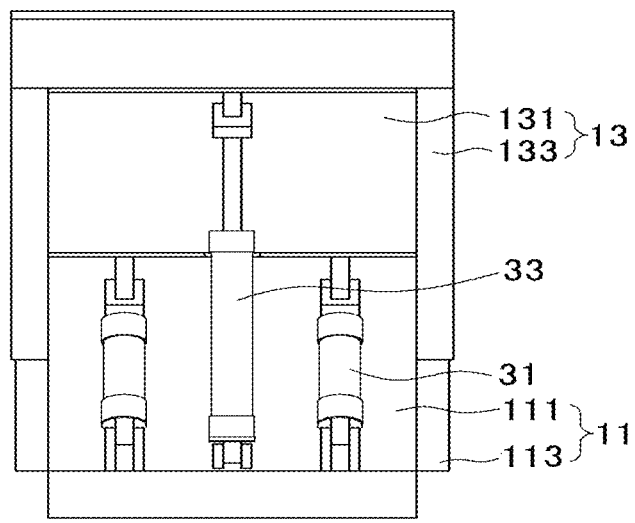
Figure 5:
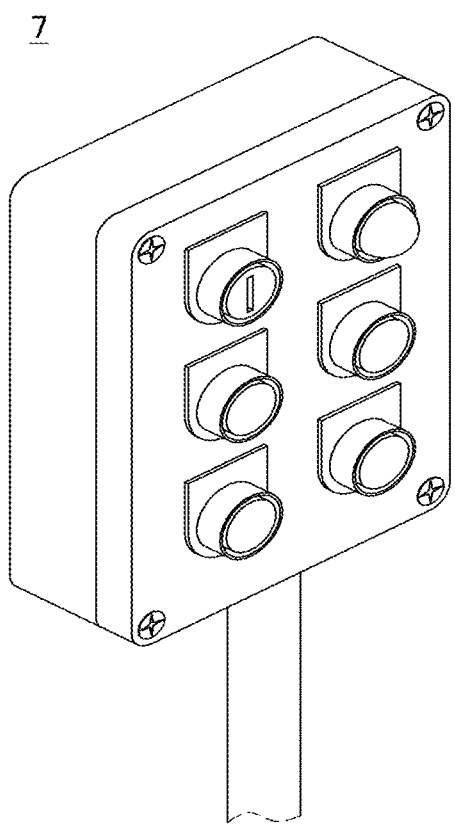
FIG. 5 is a schematic stereogram illustrating a controller according to the example embodiment.
Figure 6:
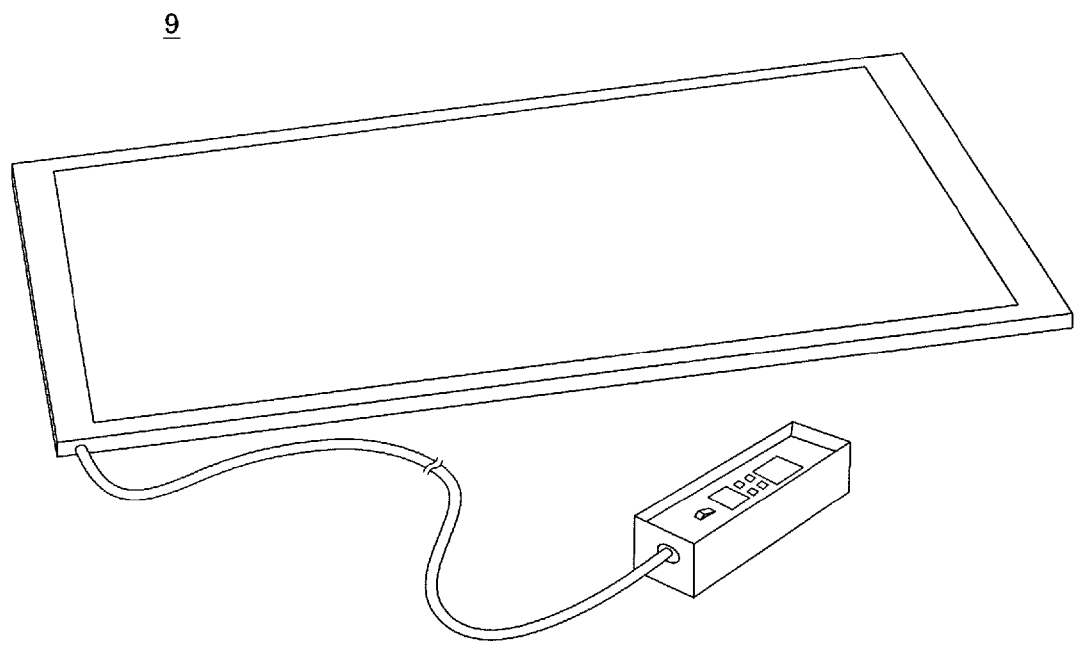
FIG. 6 is a schematic stereogram illustrating a counter unit according to the example embodiment.
Figure 7:
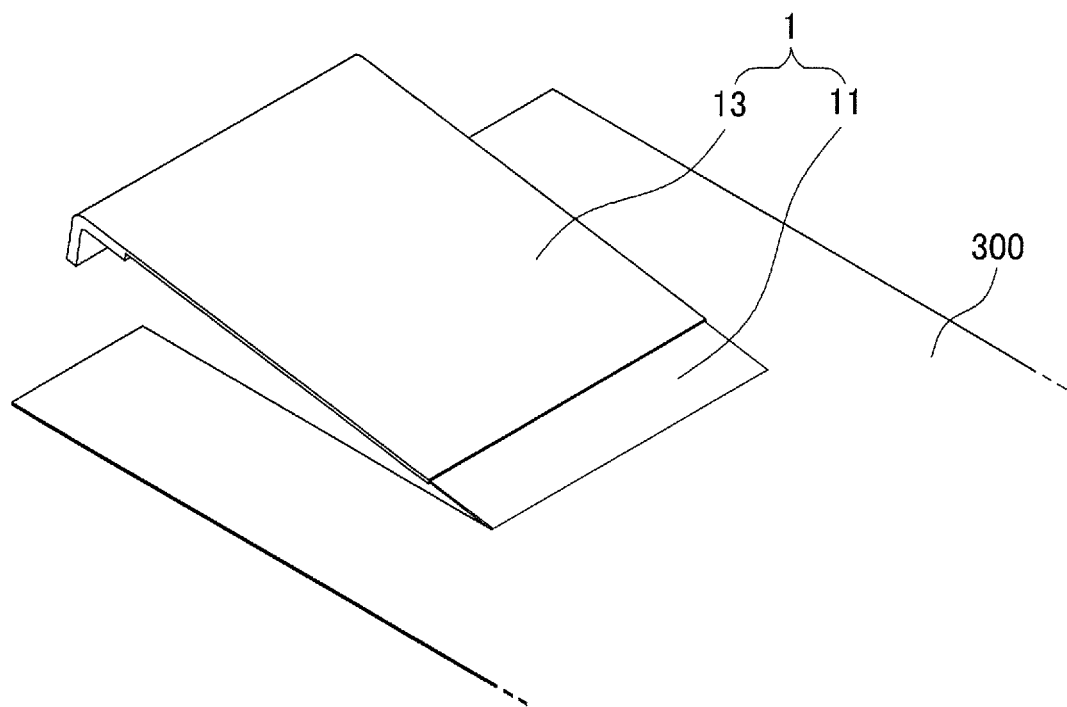
FIG. 7 is a schematic conceptual diagram only illustrating a slope type footrest unit to describe a state in which the automatic slope adjusting device is operated.

FIG. 1 is a schematic side view of the automatic slope adjusting device according to the example embodiment, in which a guide member and an engagement member are not illustrated. FIG. 2 is a schematic bottom view of the automatic slope adjusting device according to the example embodiment. FIG. 3A to FIG. 3C are schematic conceptual side views illustrating an operation of the automatic slope adjusting device according to the example embodiment. FIG. 4A and FIG. 4B are schematic conceptual diagrams for describing a relative sliding movement of a second footrest with respect to a first footrest through engagement between a guide member of the first footrest and an engagement member of the second footrest. FIG. 5 is a schematic stereogram illustrating a controller according to the example embodiment. FIG. 6 is a schematic stereogram illustrating a counter unit according to the example embodiment. FIG. 7 is a schematic conceptual diagram only illustrating a slope type footrest unit to describe a state in which the automatic slope adjusting device is operated.

Referring to FIG. 1 to FIG. 7, the subject automatic slope adjusting device includes a slope type footrest unit 1.

Referring to FIG. 7, the slope type footrest unit 1 is configured to form a slopped passage.

Further, referring to FIG. 1, the subject automatic slope adjusting device includes a driving unit 3.

Referring to FIG. 3A and FIG. 3B, the driving unit 3 is configured to adjust an inclination angle of the slope type footrest unit 1.

Further, referring to FIG. 3A and FIG. 3C, the driving unit 3 is also configured to adjust a length of the slope type footrest unit 1 in a forward-backward direction.

The slope type footrest unit 1 is embedded in a floor, and, when necessary, the slope type footrest unit 1 is driven by the driving unit 3 to form a sloped passage.

By way of example, the slope type footrest unit 1 may be embedded in a passage floor 300 at a front end of a boarding bridge. When a height difference is generated between the passage floor 300 and a boarding gate floor 100 of an airplane, the slope type footrest unit 1 is operated to form a slopped passage led from the passage floor 300 to the boarding gate floor 100, as indicated in FIG. 3C and FIG. 7.

To elaborate, the slope type footrest unit 1 is operated by the driving unit 3 as follows.

Referring to FIG. 1 to FIG. 4B and FIG. 7 altogether, the slope type footrest unit 1 includes a first footrest 11.

Referring to FIG. 3A and FIG. 3B, an inclination angle of the first footrest 11 is adjustable.

As depicted in FIG. 2, the first footrest 11 includes a first plate 111; and guide members 113 formed at a left side and a right side of the first plate 111, respectively.

Here, referring to FIG. 1, FIG. 2 and FIG. 3A, the driving unit 3 includes a first linear actuator 31 configured to axially rotate the first footrest 11 in a horizontal.

The first linear actuator 31 is a motor configured to be driven linearly, and a displacement may be generated in a lengthwise direction thereof. If a displacement of the first linear actuator 31 is generated in the lengthwise direction thereof as the first linear actuator 31 is linearly driven, the first footrest 11 can be axially rotated in the horizontal direction. The first linear actuator 31 may be, by way of example, but not limitation, a hydraulic cylinder. In such a case, the linear movement of the first linear actuator 31 can be made by a movement of a piston into and out of a cylinder.

For reference, here, the horizontal direction refers to a direction (left-right direction) orthogonal to the forward-backward direction of the slope type footrest unit 1. Referring to FIG. 7, the horizontal direction may refer to a 2 o'clock-8 o'clock direction.

To elaborate, as shown in FIG. 1 to FIG. 4B, a front end of the first linear actuator 31 is hinge-coupled to the first footrest 11.

By way of non-limiting example, the front end of the first linear actuator 31 may be hinge-coupled to a front side of the first footrest 11, as illustrated in FIG. 1 to FIG. 4B.

Further, referring to FIG. 1 to FIG. 3C, a rear end of the first linear actuator 31 is hinge-coupled to a fixing member 313 which is provided at a position downwardly spaced apart from the first footrest 11.

The subject automatic adjusting device further includes a base member 5, as depicted in FIG. 1 and FIG. 3A to FIG. 3C.

As shown in FIG. 1 to FIG. 3C, the base member 5 is provided at the rear of the first plate 11.

At this time, though not illustrated in detail in the drawings, a rear end of the first footrest 11 may be fixed to the base member 5 in such a manner as to be axially rotatable in the horizontal direction.

For example, the read end of the first footrest 11 and an upper end of the base member 5 may be hinge-coupled. Here, however, the way to connect the rear end of the first footrest 11 and the base member 5 may not be limited to the hinge-coupling. The rear end of the first footrest 11 may be fastened to the base member 5 through any of various known mechanisms so that the first footrest 11 is rotatable about the axis in the horizontal direction.

Furthermore, as depicted in FIG. 1 and FIG. 3A to FIG. 3C, the base member 5 may be disposed under the passage floor 300. Further, as depicted in FIG. 1 and FIG. 3A to FIG. 3C, the base member 5 may have a preset length in an up-and-down direction.

Here, as shown in FIG. 1, FIG. 2 and FIG. 3A, the fixing member 313 may be provided on a front surface of the base member 5 (i.e., referring to FIG. 3A to FIG. 3C, a surface facing the airplane with respect to the base member 5).

Referring to FIG. 3A and FIG. 3B, with the above-described configuration, if the first linear actuator 31 is linearly operated such that its length is increased, for example, the front side of the first footrest 11 which is hinge-coupled to the first linear actuator 31 is pushed upwards. Accordingly, the first footrest 11 is axially rotated in the horizontal direction in a clockwise direction, so that the inclination angle of the first footrest 11 is increased.

To the contrary, if the first linear actuator 31 is linearly operated such that its length is decreased, the front end of the first footrest 11 which is hinge-coupled to the first linear actuator 31 is pulled. Accordingly, the first footrest 11 is rotated about the axis in the horizontal direction in a counterclockwise direction, so that the inclination angle of the first footrest 11 is decreased.

Furthermore, referring to FIG. 1 to FIG. 4B and FIG. 7, the slope type footrest unit 1 includes a second footrest 13.

Referring to FIG. 1 to FIG. 4B, the second footrest 13 includes a second plate 131 placed on the first plate 111; and engagement members 133 provided at a left side and a right side of the second plate 131, respectively, so as to be engaged with the guide members 113.

Though not discretely illustrated in the drawings, referring to FIG. 2, FIG. 4A and FIG. 4B, each guide member 113 of the first footrest 11 may have an L-shape or a one-side-opened rectangular shape ('⊏'). Each engagement member 133 may be formed to be engaged with this guide member 113. That is, the engagement member 133 may be inserted into the L-shaped or the one-side-opened rectangular shaped guide member 113 and rail-combined thereto so as to be slidable in the forward-backward direction.

Referring to FIG. 3A and FIG. 3C and FIG. 4A and FIG. 4B altogether, the second footrest 13 is configured to be slidable relative to the first footrest 11 in the forward-backward direction.

To elaborate, as shown in FIG. 1, FIG. 2 and FIG. 3B, the driving unit 3 includes a second linear actuator 33 configured to drive the second footrest 13 in the forward-backward direction with respect to the first footrest 11.

The second linear actuator 33 is a motor configured to be driven linearly, and a displacement may be generated in a lengthwise direction thereof. The second linear actuator 33 may be, by way of example, but not limitation, a hydraulic cylinder. In this case, the linear movement of the second linear actuator 33 can be made by a movement of a piston into and out of a cylinder.

A rear end of the second linear actuator 33 is hinge-coupled to a bottom surface of the first footrest 11, and a front end of the second linear actuator 33 is hinge-coupled to a bottom surface of the second footrest 13.

Further, the engagement members 133 are configured to be slidable in the forward-backward direction along the guide members 113.

With the above-described configuration, if the second linear actuator 33 is linearly driven such that its length is increased, for example, the second footrest 13 which is hinge-coupled to the front end of the second linear actuator 33 is driven forwards relative to the first footrest 11 which is hinge-coupled to the rear end of the second linear actuator 33.

To the contrary, if the second linear actuator 33 is linearly driven such that its length is decreased, the second footrest 13 which is hinge-coupled to the front end of the second linear actuator 33 is driven backwards relative to the first footrest 11 which is hinge-coupled to the rear end of the second linear actuator 33.

Accordingly, referring to FIG. 4A and FIG. 4B in comparison, the length of the slope type footrest unit 1 in the forward-backward direction can be adjusted by the sliding motion of the second footrest 13.

Furthermore, referring to FIG. 1 to FIG. 3C, a front end 15 of the second plate 131 may be bent and extended downwards.

With this configuration, a gap that might be formed between the front end of the second plate 131 and the boarding gate floor 100 can be blocked, as shown in FIG. 3C, so that a problem that a user' foot gets caught in the gap can be avoided.

Furthermore, as stated above, the first footrest 11 is provided with the guide members 113 at the left side and the right side thereof, respectively. The engagement members 133 of the second footrest 13 are provided to enclose these guide members 113, respectively. In this way, as the guide members 113 and the engagement members 133 are engaged with each other at the left side and the right side, a step between the first plate 11 and the second plate 13 is reduced to a size approximately corresponding to a thickness of only the second plate 13, not the entire thickness of the second footrest 13.

If the guide members 113 are provided on a top surface of the first footrest 11, not at the lateral sides thereof, and if the entire second footrest 13 is placed on top of the first footrest 11, a step as large as the entire thickness of the second footrest 13 would be formed. That is, since the engagement members 133 are engaged with the guides 113 in such a manner as to enclose the guide members 113 at the left and right side through male-female fitting, the first plate 11 as the top plate of the first footrest 11 and the second plate 131 as the top plate of the second footrest 13 can be vertically arranged adjacent to each other. Thus, the gap formed between the first footrest 11 and the second footrest 13 can be minimized.

Furthermore, referring to FIG. 6, the subject automatic slope adjusting device includes a controller 7 configured to control the driving unit 3.

Though not illustrated in detail in the drawing, the controller includes, by way of non-limiting example, an up-button and a forward-button. In this case, by driving the first linear actuator 31 through the up-bottom, the front side of the first footrest 11 can be raised and the slopped passage can be formed, as depicted in FIG. 3B. Furthermore, by driving the second linear actuator 33 through the forward-button, the length of the slopped passage can be lengthened, as depicted in FIG. 3C.

In addition, the subject automatic sloped adjusting device may further include a safety sensor (not shown in the drawings) configured to detect an approach of the slope type footrest unit 1 to a body of the airplane.

By detecting the approach of the slope type footrest unit 1 to the body of the airplane in advance through the safety sensor before the slope type footrest unit 1 bumps into contact with the main body of the airplane, a damage of the airplane that might be infringed due to a contact between the slope type footrest unit 1 and the main body of the airplane can be prevented. Therefore, safety in driving the slope type footrest unit 1 can be improved.

As one example, referring to FIG. 1 and FIG. 3A to FIG. 3C, the safety sensor may be provided at the front end 15 of the second footrest 13 to face the airplane. Alternatively, the safety sensor may be provided at an exterior surface of the airplane to face the slope type footrest unit 1, as depicted in FIG. 3A to FIG. 3C.

By way of example, the safety sensor may be implemented by a distance sensor configured to detect a distance between the front end 15 of the second footrest 13 and the airplane.

Further, when installing the safety sensor, electrical wiring and installation method thereof should be considered not to affect (interfere with) the operation of the slope type footrest unit 1.

Moreover, referring to FIG. 6, the subject automatic slope adjusting device may include a counter unit 9 configured to calculate the number of passengers that have come in or out of the airplane.

As depicted in FIG. 6, the counter unit 9 may be of a mat type.

The counter unit 9 may be installed on a floor. By way of example, the counter unit 9 may be placed on the boarding gate floor 100 of the airplane, or on the passage floor 300. As another example, the counter unit 9 may be provided on the slope type footrest unit 1.

Moreover, the counter unit 9 may have an additional function depending on the installation environment where it is installed. For example, the counter unit 9 may have a function of storing the calculated number of passengers. The additional function may be added after fully considering a malfunction that might be caused by the installation environment.

Further, the subject automatic slope adjusting device may include a display unit, though not shown in the drawing. An operational status of the counter unit 9 is visually displayed through the display unit. For example, the number of the passengers calculated by the counter unit 9 can be visually outputted. Thus, the number of passengers that have got off the airplane and the number of passengers that have got in the airplane can be calculated and displayed, thus allowing a flight attendance and a boarding bridge operator to be informed of the user information promptly. By way of non-limiting example, the display unit may be a monitor.

Further, the inclination angle and the length of the slope type footrest unit 1 may be visually outputted through the display unit. Moreover, the state of the safety sensor may be visually displayed through the display unit. Besides, various information that can be referred to by the flight attendant and the boarding bridge operator can be displayed through the display unit.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A slope adjusting device, comprising:
  a slope type foot ramp unit configured to form a sloped passage; and
  a driving unit configured to adjust an inclination angle of the slope type foot ramp unit, and a length of the slope type foot ramp unit in a forward-backward direction thereof,
  wherein the slope type foot ramp unit is provided in a passage floor at a front end of a boarding bridge, and is configured to form a sloped passage led from the passage floor to a boarding gate floor of an airplane when there is a height difference between the passage floor and the boarding gate floor, and
  wherein the slope type foot ramp unit comprises:
    a first foot ramp of which a rear end is fastened to a base member by an hinge so that the first foot ramp is axially rotatable about the hinge, an inclination angle of the first foot ramp being thus adjustable; and
    a second foot ramp configured to be slidable relative to the first foot ramp in the forward-backward direction,
    wherein the length of the slope type foot ramp unit in the forward-backward is adjusted by the sliding of the second foot ramp,
  the first foot ramp comprises a first plate, and guide members formed at a left side and a right side of the first plate, respectively,
  the second foot ramp comprises a second plate located on the first plate, and engagement members formed at a left side and a right side of the second plate so as to be engaged with the guide members and configured to be slidable in the forward-backward direction along the guide members, and
  the driving unit comprises:
    a first linear actuator of which a front end is hinge-coupled to the first foot ramp and a rear end is hinge-coupled to a fixing member downwardly spaced apart from the first foot ramp, and configured to axially rotate the first foot ramp in the horizontal direction; and
    a second linear actuator of which a rear end is hinge-coupled to a bottom surface of the first foot ramp and a front end is hinge-coupled to a bottom surface of the second foot ramp, and configured to drive the second foot ramp relative to the first foot ramp in the forward-backward direction.

2. The slope adjusting device of claim 1,
  wherein the fixing member is provided on a front surface of the base member.

3. The slope adjusting device of claim 1,
  wherein a front end of the second plate is bent and extended downwards.

4. The slope adjusting device of claim 1, further comprising:
  a safety sensor configured to detect an approach of the slope type foot ramp unit to a body of the airplane.

5. The slope adjusting device of claim 1, further comprising:

a counter unit configured to calculate the number of passengers that have got in and off the airplane.

6. The slope adjusting device of claim 5, wherein the counter unit is of a mat type.

* * * * *